Figure 5:
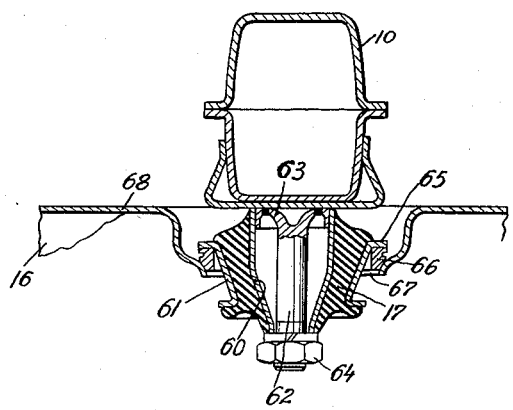

Jan. 28, 1964         J. MÜLLER         3,119,628
MOUNTING OF AN AUXILIARY FRAME IN VEHICLES
Original Filed Dec. 5, 1956         3 Sheets-Sheet 1
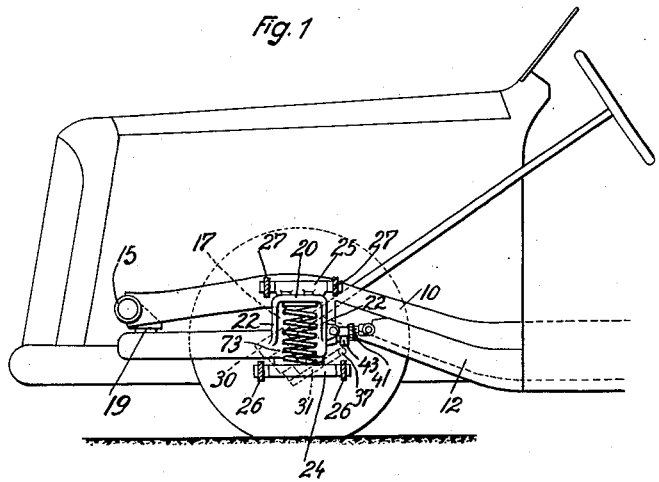
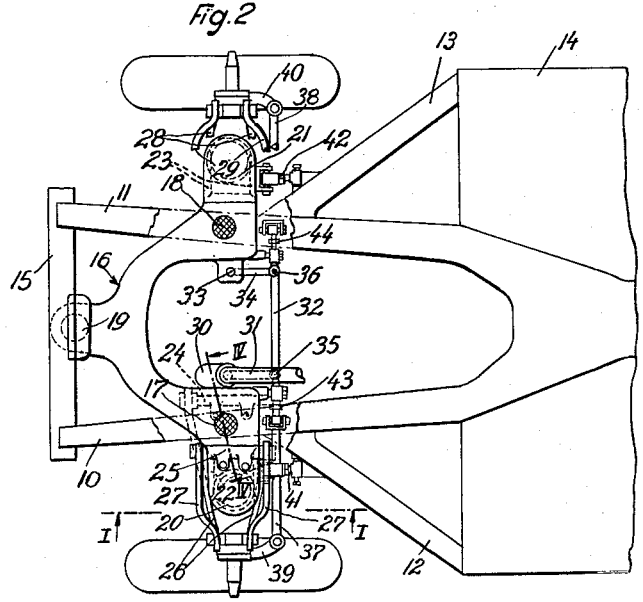
Inventor
JOSEF MÜLLER
BY Dicke and Craig
ATTORNEYS.

Jan. 28, 1964            J. MÜLLER           3,119,628
MOUNTING OF AN AUXILIARY FRAME IN VEHICLES
Original Filed Dec. 5, 1956           3 Sheets-Sheet 2
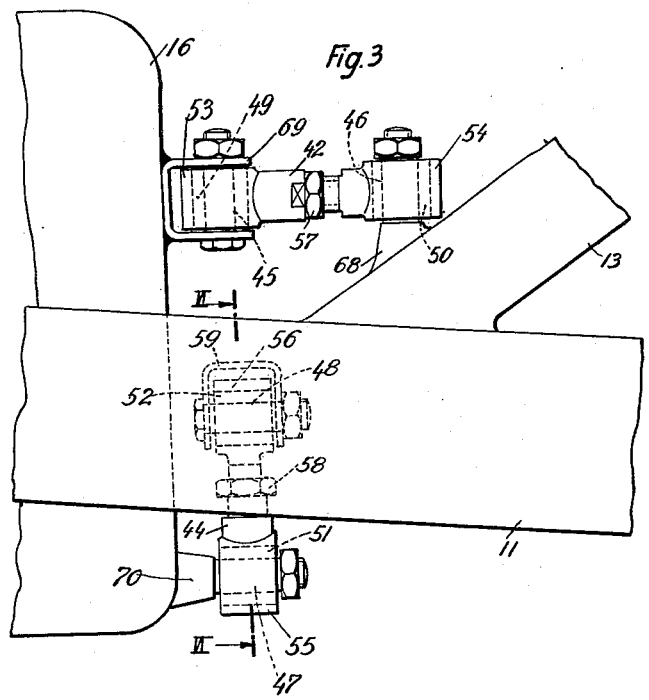
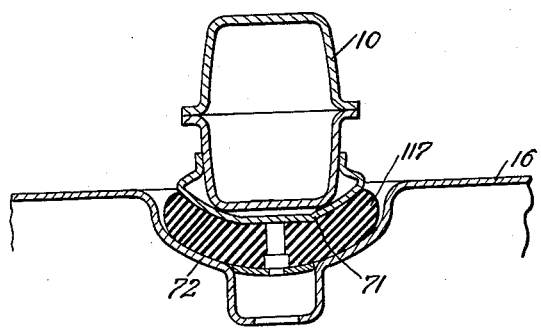
Inventor
JOSEF MÜLLER
BY Dicke and Craig
ATTORNEYS.

Jan. 28, 1964   J. MÜLLER   3,119,628
MOUNTING OF AN AUXILIARY FRAME IN VEHICLES
Original Filed Dec. 5, 1956   3 Sheets-Sheet 3

Inventor
JOSEF MÜLLER
BY Dicke and Craig
ATTORNEYS.

United States Patent Office 3,119,628
Patented Jan. 28, 1964

3,119,628
MOUNTING OF AN AUXILIARY FRAME
IN VEHICLES
Josef Müller, Stuttgart-Riedenberg, Germany, assignor to Daimler-Benz Aktiengesellschaft, Stuttgart-Untertürkheim, Germany
Continuation of abandoned application Ser. No. 626,373, Dec. 5, 1956. This application July 9, 1959, Ser. No. 827,674
Claims priority, application Germany Dec. 6, 1955
3 Claims. (Cl. 280—106.5)

This application is a continuation of the application of Josef Mueller, Serial No. 626,373, filed December 5, 1956, entitled Mounting of an Auxiliary Frame in Vehicles, now abandoned.

My invention relates to a vehicle, more particularly a motor vehicle, of the type in which the main chassis frame or body is carried by an auxiliary frame supported on the wheels, more especially the steering wheels, of the vehicle through the intermediary of wheel suspension means, resilient cushions being interposed between the main frame and the auxiliary frame for resilient transfer of relative vertical forces.

The interposition of such an auxiliary frame between the wheel suspension means and the main frame of the vehicle greatly improves the riding qualities of the vehicle. This is particularly true where the cushions interposed between the two frames are highly resilient permitting the auxiliary frame to be displaced relative to the main frame in vertical direction under the effect of road impacts, engine vibration, etc. through a large distance. High resiliency of said cushions, however, is liable to have the unwanted side effect of permitting the auxiliary frame to perform undesirable horizontal movements relative to the main frame. Particularly where the auxiliary frame is braced by the wheel suspension means upon the steerable wheels of the vehicle, horizontal displacement of the frames relative to each other is liable to adversely affect the steering function and the riding qualities of the vehicle. Therefore, it is the primary object of the present invention to provide the vehicle with means which will eliminate or altogether preclude horizontal displacements of the frames relative to each other without substantially interfering with vertical displacement of said frames relative to each other.

More particularly it is an object of my invention to provide a vehicle of the type above indicated in which the auxiliary frame will resiliently absorb any vertical impacts acting upon one or the other of the wheels by a pivotal movement about the central longitudinal axis of the vehicle relative to the main frame but will resist any couple tending to turn the auxiliary frame within a horizontal plane about a vertical axis relative to the main frame.

Finally it is an object of the invention to so relatively dispose the elements connecting the auxiliary frame to the main frame that lateral forces acting on the wheels will not set up any substantial couple tending to turn the auxiliary frame relative to the main frame about a vertical axis.

Further objects of my invention will appear from a detailed description of a preferred embodiment of my invention following hereinafter with reference to the accompanying drawings. It is to be understood, however, that my invention is in no way limited to the details of such embodiment and that the terms and phrases used in such detailed description have been chosen for the purpose of explanation rather than that of restriction or limitation of the invention, the scope of the latter being set forth in the appended claims.

Figure 6:
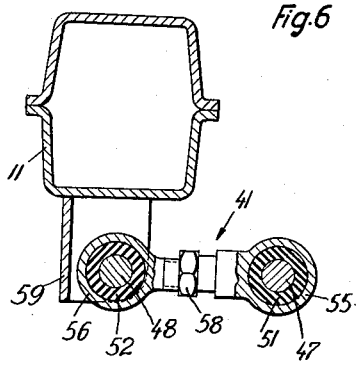

In the drawings in which a preferred embodiment of the invention is shown,

FIGURE 1 is a side view of the front portion of a motor vehicle chassis, partly in section taken along the line I—I of FIGURE 2 viewed in the direction of the arrows, FIGURE 2 is a plan view of the chassis portion shown in FIGURE 1, the wheels being indicated diagrammatically only, FIGURE 3 is a portion of FIGURE 2 shown on an enlarged scale, FIGURE 4 is a partial section taken along the line IV—IV of FIGURE 2 on an enlarged scale, FIGURE 5 is a view, similar to that of FIGURE 4, of a modified structure, and FIGURE 6 is the section taken along the line VI—VI of FIGURE 3.

My invention is equally applicable to vehicles in which the body is detachably mounted on a main chassis frame and to vehicles in which the body itself constitutes the frame. Hence, the term "main frame" as used hereinafter and in the claims is intended to cover both, a self-contained body and a chassis frame. In the accompanying drawings my invention is illustrated with reference to a vehicle in which the body forms a unitary structure with the main frame.

The main frame comprises a central longitudinal beam bifurcated at its front, the bifurcations 10 and 11 projecting forwardly from a floor panel 14 of the body, diagonal braces 12 and 13 extending from the front corners of the floor panel 14 to the central portion of the bifurcations 10 and 11 being rigidly connected therewith. The front ends of the bifurcations 10 and 11 are connected by a horizontal transverse tubular frame member 15.

The main frame composed of the elements 10, 11, 12, 13 and 14 is located above and carried by an auxiliary frame designated by 16 as a whole.

While each of the elements 10 and 11 of the main frame are formed by a pair of channel members having their flanges welded to each other as shown in FIGURE 6, the auxiliary frame comprises a hollow sheet metal member having horseshoe shape symmetric with respect to the vertical central longitudinal plane of the body and formed with outward projections at the ends of its arms and at its center, substantially as shown and described in my co-pending application, Serial Number 553,574, filed on December 16, 1955, now Patent No. 2,837,348. With respect to further details of the structure of the auxiliary frame reference may be had to such co-pending application.

Relatively soft resilient elements, such as cushions 17, 18 and 19 of rubber or any other rubber-like material are secured to the main frame and to the auxiliary frame to transfer relative vertical forces. While the cushion 19 is interposed between the forward projection of the horseshoe shaped auxiliary frame and the transverse tubular frame member 15 of the main frame, each of the cushions 17 and 18 is interposed between one of the members 10, 11 and the rearward end portion of the auxiliary frame.

The outward projections of the auxiliary frame are formed by horizontal plates 20 and 21 having downwardly projecting flanges 22, or 23 respectively, extending transversely with respect to the direction of travel of the vehicle and serving to reinforce the plates 20 and 21.

Suitable wheel suspension means comprising lower wishbone links 26 and upper wishbone links 27 are mounted on the auxiliary frame 16 and are associated with the steerable wheels for guiding the latter for up-and-down movement relative to the auxiliary frame 16 and the main frame 10—14. The lower wishbone links 26 are pivoted to brackets 24 bolted to the bottom of the auxiliary frame 16, whereas the upper wishbone links 27 are pivoted to brackets 25 bolted on top of the brackets 20 and 21. The right-hand bracket 25 has been omitted in FIGURE 2 for the sake of a clearer illustration of the plate 21. Suitable springs are associated with the wheel suspension means just described and with the auxiliary frame to resiliently support the latter on the wheels. Preferably the springs are helical springs not shown inserted between the plates 20 and 21 on the one hand and the lower wishbone links 26 on the other hand in a manner well known in the art.

A steering gear housing 30 is mounted on the auxiliary frame 16 and adapted to impart pivotal movement to a steering arm 31 extending from the housing 30 rearwardly and upwardly to a transverse horizontal rod 32 which extends between the arm 31 and a second arm 34 which is pivotally connected at 33 to the auxiliary frame 16. Pivot pins 35 and 36 connect the link 32 to the arms 31 and 34 and to steering links 37 and 38 extending therefrom outwardly to the steering arms 39 and 40 connected with the swivel members which are guided by the wishbone links and carry the steerable wheels. The driving unit composed of engine and transmission not shown is likewise mounted on and partly embraced by the auxiliary frame 16.

As shown in FIGURE 5 the rubber cushion 17 may have the form of a substantially tubular member having its inner surface bonded to a metal sleeve 60 and having its outer surface bonded to another metal sleeve 61, both sleeves extending in spaced co-axial relationship. The inner sleeve 60 surrounds a vertical pin 62 which depends from the bottom of the frame member 10 and has a foot portion 63 welded thereto. A nut 64 screwed upon the threaded end of pin 62 serves to rigidly connect the sleeve 60 to the frame member 10. The outer sleeve 61 has a flange 65 at its upper end which rests on a ring 66 secured to the marginal portion of an opening 67 provided in a depressed portion of the top wall 68 of the auxiliary frame 16. As a result, the rubber cushion 17 permits the auxiliary frame 16 to be displaced in vertical direction through a considerable distance relative to the main frame member 10. Since the radial thickness of the rubber cushion 17 is considerable, the rubber cushion is unable to prevent a substantial lateral displacement of the auxiliary frame 16 relative to the main frame. Such lateral displacements, however, are liable to react upon the steering and the riding qualities of the vehicle. Therefore I have provided a plurality of links 41, 42, 43 and 44 each of which is pivotally connected to both the auxiliary frame 16 and the main frame, and is disposed to oppose the undesirable horizontal displacement without substantially interfering with any vertical displacement of the frames relative to each other. Preferably the links 41 and 42 extend substantially in the longitudinal direction of the vehicle to transfer braking and accelerating forces between the frames while the links 43 and 44 extend transversely with respect to the vehicle for the transfer of transverse forces between the frames.

The links 41, 42 are disposed on both sides of the central vertical longitudinal plane of the vehicle and are preferably spaced therefrom a larger distance than the relatively soft resilient element 17 and 18 as will appear from FIGURE 2.

Each of the diagonal braces, such as 13, is formed with a lateral boss 68 in which a pivot pin 46 is inserted so as to extend outwardly therefrom in horizontal direction. A U-shaped bracket 69 is welded to the rear flange 22 or 23 respectively of the auxiliary frame 16 and a horizontal pin 45 extends between its arms parallel to the pin 46. The link 42 is formed with eyes on its ends which embrace the pivot pins 45 and 46, sleeves or rubber or a rubber-like material 49 and 50 being interposed therebetween. Similar joints are provided for pivotally connecting the link 41 to both of the frames.

The transverse links 43 and 44 are mounted in a similar manner, each extending between a pin 48 carried by a U-shaped bracket 59 welded to the bottom of the frame member 11 and a pin 47 extending rearwardly and parallel to pin 48 from a boss 70 provided on the rear face of the rear flange 22. The link 41, too, is formed with eyes 45 and 46 on its ends which surround the pins 47 and 48, sleeves 51 and 52 of rubber being interposed therebetween.

Preferably, the links 41 and 42 extend substantially parallel to and in proximity of a horizontal transverse line connecting the axes of the steerable wheels of the vehicle.

Moreover it is desirable that the links 43 and 44 be disposed substantially in or closely adjacent to the horizontal plane of movement of the steering links 32, 37 and 38. As a result any movements which the auxiliary frame 16 may be subjected to relative to the main frame in lateral direction will have no effect in the plane of steering linkage and will not adversely affect the steering of the vehicle.

Preferably, means are provided for adjusting the length of the links 41, 42, 43 and 44. For this purpose each link is composed of two parts having threaded engagement and being locked in an adjusted position by a locking nut 58.

From the foregoing description it will appear that the links 41, 42, 43 and 44 prevent any substantial displacement of the auxiliary frame 16 with respect to the main frame in the horizontal plane. This is of particular importance because of the considerable resiliency of the rubber cushions 17 and 19. The provision of very soft rubber cushions is desirable, however, in order to absorb noise and impacts originating from the travel of the wheels on the road.

In FIGURE 4 I have illustrated a modified cushion 117, the same being in form of a dished rubber plate inserted in a depressed portion 72 of the top wall of the auxiliary frame 16 and carrying a circular dished sheet metal member 71 which in its turn carries and is welded to the frame member 10. Here again the rubber cushion 117 is bonded to both the portion 72 and the member 71.

From the foregoing it will appear that in addition to the relative soft resilient elements such as 17, 18 and 19, transferring the weight of the body or frame to the auxiliary frame I have provided links such as 41–44 connecting the auxiliary frame and the main frame so as to permit a relative vertical displacement of the frames while preventing any substantial horizontal displacement. In this manner it is possible to provide very soft cushions for cushioning relative vertical displacement without risking any adverse effect upon the steering and riding qualities of the vehicle. By suitable adjustment of the lengths of the links the auxiliary frame may be exactly aligned within a horizontal plane. As the longitudinal links such as 41 and 42 are farther spaced from the longitudinal central axis of the vehicle than the cushions such as 17 and 18, any impact acting upon one of the two wheels only will be readily absorbed because the auxiliary frame is capable of turning about the central longitudinal axis of the vehicle on account of such relatively smaller distance of the rubber cushions from the longitudinal central axis. On the other hand, however, the auxiliary frame is so mounted as to effectively resist any couple tending to turn it in the horizontal plane about a vertical axis. Since the transverse links 43 and 44 are spaced a short distance only from a line connecting the axes of the wheels, the lateral forces acting on the links 43, 44 will not produce considerable couples in coaction with lateral forces acting on the wheels so that there will be no tendency to turn the auxiliary frame about a vertical axis.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or

I claim:

1. In a vehicle, the combination comprising a main frame, an auxiliary frame carrying said main frame, at least one pair of wheels, wheel suspension means mounted on said auxiliary frame and associated with said wheels for guiding the latter for up-and-down movement relative to said frames, springs associated with said wheel suspension means and said auxiliary frame to resiliently support the latter on said wheels, soft resilient elements secured to said frames to transfer relative vertical forces, said soft, resilient elements being spaced from the central vertical, longitudinal plane of the vehicle, and a plurality of adjustable links each pivotally connected to both of said frames and disposed to oppose horizontal displacement without interfering with vertical displacement of said frames relative to each other, said plurality of links including first links extending substantially parallel to the central, vertical longitudinal plane of the vehicle and spaced therefrom, said plurality of links further including second links extending substantially parallel to and in proximity of a line connecting the axes of said pair of wheels, the distance between said first links and said central vertical longitudinal plane being greater than the distance of said plurality of soft resilient elements from said plane.

2. In a vehicle, the combination comprising a main frame, an auxiliary frame carrying said main frame, at least one pair of wheels, wheel-suspension means mounted on said auxiliary frame and associated with said wheels for guiding the latter for up-and-down movement relative to said frames, springs associated with said wheel-suspension means and said auxiliary frame to resiliently support the latter on said wheels, relatively soft resilient elements secured to said frames to transfer relative vertical forces, and a plurality of links, each pivotally connected to both of said frames and disposed to oppose horizontal displacement without substantially interfering with vertical displacement of said frames relative to each other, said plurality of links including a pair of links spaced from the central, vertical, longitudinal plane of the vehicle and disposed on both sides thereof and extending substantially parallel to said plane, said relatively soft resilient elements being spaced from said plane a shorter distance than said links.

3. The combination claimed in claim 2, wherein each of said relatively soft resilient elements comprises a rubber member of substantially tubular shape, an outer metal sleeve bonded to the outer surface of said rubber member, an inner metal sleeve bonded to the inner surface of said rubber member, a member received within said inner metal sleeve and connected thereto and to one of said frames, and said outer metal sleeve being connected to the other of said frames.

References Cited in the file of this patent

UNITED STATES PATENTS

| | | |
|---|---|---|
| 2,020,597 | Appel | Nov. 12, 1935 |
| 2,290,620 | Brown | July 21, 1942 |
| 2,323,007 | Borgward | June 29, 1943 |
| 2,633,203 | Paton | Mar. 31, 1953 |
| 2,708,003 | Nallinger et al. | May 10, 1955 |
| 2,720,374 | Hutton | Oct. 11, 1955 |
| 2,794,610 | Hirst et al. | June 4, 1957 |

FOREIGN PATENTS

| | | |
|---|---|---|
| 1,161,929 | France | Mar. 31, 1958 |